United States Patent [19]
Hickory et al.

[11] Patent Number: 5,104,424
[45] Date of Patent: Apr. 14, 1992

[54] ABRASIVE ARTICLE

[75] Inventors: Gordon E. Hickory, Rutland; Robert N. Smith, Grafton; Renato Terragni, Holden, all of Mass.

[73] Assignee: Norton Company, Worcester, Mass.

[21] Appl. No.: 541,885

[22] Filed: Jun. 4, 1990

Related U.S. Application Data

[63] Continuation-in-part of Ser. No. 438,122, Nov. 20, 1989, abandoned.

[51] Int. Cl.$^5$ ................................................ B24D 3/02
[52] U.S. Cl. ........................................ 51/309; 51/298; 51/308
[58] Field of Search ............................ 51/298, 308, 309

[56] References Cited

U.S. PATENT DOCUMENTS

| | | | |
|---|---|---|---|
| 1,524,134 | 3/1925 | Hutchins | 51/296 |
| 1,830,757 | 7/1931 | Hartmann | 51/296 |
| 1,956,905 | 4/1934 | Merriam | 51/296 |
| 1,986,850 | 10/1935 | Pohl | 51/296 |
| 2,806,772 | 11/1957 | Robie | 51/296 |
| 2,986,455 | 8/1961 | Sandmeyer | 51/296 |
| 3,329,488 | 6/1967 | Cofran | 51/296 |
| 3,661,544 | 5/1972 | Whitaker | 51/295 |
| 4,226,602 | 2/1980 | Fukada | 51/296 |
| 4,314,827 | 2/1982 | Leitheiser | 51/298 |
| 4,606,738 | 8/1986 | Hayden | 51/295 |
| 4,623,364 | 11/1986 | Cottringer | 51/309 |
| 4,741,743 | 5/1988 | Narayan | 51/309 |
| 4,744,802 | 5/1989 | Schwabel | 51/309 |
| 4,800,685 | 8/1989 | Haynes | 51/281 |
| 4,883,501 | 11/1989 | Haynes | 51/309 |
| 4,898,597 | 2/1990 | Hay et al. | 51/309 |
| 4,964,883 | 10/1990 | Morris et al. | 51/309 |
| 4,988,370 | 1/1991 | Haynes, Jr. | 51/309 |

FOREIGN PATENT DOCUMENTS 0318168 11/1987 European Pat. Off. .

Primary Examiner—William R. Dixon, Jr.
Assistant Examiner—Willie J. Thompson
Attorney, Agent, or Firm—David Bennett

[57] ABSTRACT

Abrasive wheel using sol gel alumina particles and silicon carbide abrasive particles in a high elastic modulus bond containing an inorganic filler.

17 Claims, No Drawings

ABRASIVE ARTICLE

This is a continuation-in-part application of U.S. application Ser. No. 07/438,122, filed Nov. 20, 1989, now abandon.

BACKGROUND OF THE INVENTION

Among the recent developments in the field of the grinding of metals has been the use of the so-called "sol-gel alumina" abrasive particles. In the Leitheiser U.S. Pat. No. 4,314,827, a description is given of a form of alumina abrasive having a microcrystalline structure of crystallites obtained by the sintering of a sol gel form of alumina; the patent describes the formation of an abrasive wheel by incorporating such a sintered sol gel alumina abrasive in a phenolic resin bond. The abrasive obtained by the sintered sol gel method described in the Leitheiser patent is a calcium ion-free and alkali metal ion-free, dense, non-fused, synthetic, aluminum oxide-based granular abrasive mineral, having a substantially homogeneous microcrystalline structure of randomly-oriented crystallites of alumina and a modifying component, wherein the alumina is the dominant continuous phase.

This form of alumina abrasive is being used in a number of products, including, for instance, the ceramic described in the Schwabel U.S. Pat. No. 4,744,802 which describes a method of forming the sol gel alumina abrasive particles in which a nucleating agent is added to a sol gel of alpha alumina monohydrate.

Similarly, the patent of Cottringer et al U.S. Pat. No. 4,623,364 teaches the use of seed material to enhance alumina gels in the formation of aluminous abrasive grits, while the patent of Narayanan et al U.S. Pat. No. 4,741,743 describes combining sintered gel alumina abrasive grits with fused alumina grits. Also, the patent of Haynes U.S. Pat. No. 4,800,685 teaches the use of sol gel alumina abrasive grain in a matrix to grind cast iron.

It is clear, then, that the sol gel aluminous abrasive particles (particularly the seeded sol gel aluminous abrasive particles) have demonstrated substantial advantages over other premium abrasives in broad areas of coated and bonded abrasive applications, since their introduction a few years ago. As has been stated above, such abrasives are generally made by drying and sintering a hydrated alumina gel, which may also contain varying amounts of additives, such as MgO or $ZrO_2$. The dried material is crushed (either before or after sintering) to obtain irregular, blocky-shaped polycrystalline abrasive grits in a desired size range. The grits may later be incorporated in a bonded abrasive product, such as a grinding wheel or a segment. The Leitheiser patent, described above, discloses abrasive grits made by such a method in which the sintered grits contain irregular "snowflake" shaped alpha $Al_2O_3$ crystals which are on the order of 5 to 10 microns in diameter. The spaces between the arms of a "snowflake" are occupied by other phases such as a finely crystalline alumina magnesia spinel.

The Cottringer et al patent, described above, discloses a sol gel method for the manufacture of aluminous abrasive grits, and products other than abrasive grits such as coatings, thin films, fibers, rods or small shaped parts, having enhanced properties. In that patent the conversion of the hydrated alumina to alpha alumina is facilitated by the introduction of seed material into the gel or the gel precursor prior to drying. This can be accomplished by either wet vibratory milling of the gel or gel precursor with alpha alumina media, or by the direct addition of very fine seed particles in powder or other form. To make abrasive grits the seeded gel is dried, crushed and fired. The abrasive grits so produced may be used in the manufacture of products such as coated abrasive disks and grinding wheels. Alternatively, to make shaped parts or rods, the material may be formed or molded as by extrusion before firing. In the case of extrusion; the rods formed are later cut or broken into appropriate lengths.

The Schwabel patent, described above, also discloses a seeded sol gel process for producing alpha alumina based ceramics useful as abrasive grain and ceramic shaped bodies. Such alpha alumina is obtained from alpha alumina monohydrate to which has been added a nucleating agent.

Once the gel has formed, it may be shaped, according to the patentee, by any convenient method such as pressing, molding or extrusion and then carefully dried to produce an uncracked body of the desired shape. If abrasive material is desired, the gel can be extruded, according to the disclosure, or simply spread out to any convenient shape and dried. After drying, the solid body or material can be cut or machined to form a desired shape or crushed or broken by suitable means, such as a hammer or ball mill, to form abrasive particles or grains.

Such seeded sol gel abrasives have a much firmer alpha $Al_2O_3$ crystal structure and higher density than the Leitheiser-type unseeded sol gel material. The alpha $Al_2O_3$ crystals of the seeded sol gel abrasives are submicron and usually on the order of about 0.4 microns and less, although somewhat coarser structure may result if the seeding is performed in a non-optimal manner or if the firing is at too high a temperature, or for too long a duration.

Other materials such as iron oxide, chromium oxide, gamma alumina, and precursors of these oxides, as well as other fine debris that will act as nucleating sites for the alpha alumina crystals being formed, can also be used as seeds to facilitate the conversion to alpha $Al_2O_3$. As a rule of thumb, such seeding materials should be isostructural with alpha $Al_2O_3$ and should have similar (within about 15%) crystal lattice parameters to work well.

When grinding the surface of hard chilled cast iron rolls, especially tougher Chromium-Iron rolls, it is customary to choose a grinding wheel that has a relatively soft grade since these tend to give the best performance. Such soft grade wheels are characterized by a sand blast penetration value (SBP) of up to about 5.1 and preferably up to about 3.1 mm and a weight per unit volume of less than about 2.8 and preferably less than about 2.20 g/cc. The "softness" of a wheel is affected by the resin bond chosen, the proportion of grit to bond material and the amount of porosity in the wheel. Typically suitable abrasive wheels consist of silicon carbide abrasive or blends of silicon carbide and alumina abrasive coupled with a low elastic modulus resinoid bond. The silicon carbide abrasive is needed to help the wheel penetrate into the hard surface of a chilled iron roll to remove metal from the surface at an acceptable rate. The low elastic modulus bond is necessary to prevent vibration from occurring between the wheel and roll surface and to prevent the development of chatter marks in the finished surface of the roll. Due to a higher toughness of chilled iron rolls made with a high chrome content, a silicon carbide/alumina abrasive blend is preferred. If silicon carbide alone were used on chrome-iron rolls, the abrasive would break down too rapidly, resulting in low metal removal rate. The stronger alumina helps to reduce wheel wear and improve abrasive penetration.

In most cases, steel mill production requires the grinding of a mixture of both high chrome and plain chilled iron with a single wheel. The abrasive selected in such cases is usually silicon carbide, which is found to be the most versatile. By using silicon carbide alone, abrasive penetration is ensured on the very hard chilled iron rolls. However, metal removal rate is compromised (reduced compared to the metal removal rate obtained with silicon carbide/alumina) on the tougher Chrome-Iron rolls. These and other difficulties experienced with the prior art abrasive wheels have been obviated in a novel manner by the present invention.

The present invention provides an abrasive wheel that is particularly suitable for roll grinding very hard materials. The abrasive wheel, has excellent wheel life and metal removal rate on chilled iron rolls and has chatter-free operation and improved roll shape control when used to finish chrome-iron rolls.

The abrasive wheel of the invention also is simple in formulation and has a long useful service life.

SUMMARY OF THE INVENTION

In general, the invention consists of a soft abrasive wheel comprising sol gel alumina abrasive particles and a second type of abrasive particles comprising silicon carbide in a high elastic modulus resin bond comprising an active filler grinding aid.

More specifically, the second type of abrasive particles is selected from the class consisting of silicon carbide, alone and in combination with other abrasive particles such as cofused alumina-zirconia, sintered alumina, sintered bauxite, garnet, flint, sintered alumina-zirconia, fused alumina particles, bubble alumina and mixtures thereof.

The filler grinding aid, which forms part of the bond material, is preferably selected from the class consisting of $FeS_2$, $K_2SO_4$, cryolite, $K_3AlF_6$, $KAlF_4$, as well as other metallic sulfides and halides.

DESCRIPTION OF THE PREFERRED EMBODIMENT

It has been found in actual field testing that a blend of Norton sintered sol gel $Al_2O_3$ abrasive (SG) and silicon carbide (SiC) abrasive, when combined with a high elastic modulus bond containing a phenolic resin and an inorganic grinding aid filler such as $FeS_2$ and $K_2SO_4$, results in a wheel with significant improvement in wheel life and metal removal rate on chilled cast iron rolls, while maintaining chatter-free operation and improved roll shape control.

It will be understood that the expression "elastic modulus" refers to the characteristic that is more properly known as "Young's modulus of elasticity", E, which is a constant for any material and is the factor of proportionality between stress and strain:

$$E = \frac{s}{e} = \frac{stress}{strain}$$

The value of the modulus is derived in practice by non-destructive testing of a finished wheel to determine its resonant frequency, which is itself a function of the modulus. For the purposes of the present invention, a "high elastic modulus" means that the elastic modulus is over $20 \times 10^6$ dynes/cm$^2$. This is quite high by comparison with conventional bonds for soft wheels which often incorporate a low crosslinked component such as a novolac or a rubber. Normally a phenolic resin used for the production of soft grade wheels will have a modulus of from about $13 \times 10^6$ dynes/cm to about $18 \times 10^6$ dynes/cm. As will be appreciated the modulus of such bonds is significantly below the level desired in the present invention. The modulus of the bond used herein is enhanced to the desired level by the incorporation of an inorganic grinding aid filler.

Usually an amount of filler from about 10 to about 30 volume percent of the bond, such as from about 15 to about 25 volume percent of the bond, is sufficient to achieve the high modulus figure.

Experimental Results

Test wheels were made with the following descriptions and compositions:

| Item/Grade | Abrasive/Abr. Diluent (1) | Resin Type |
| --- | --- | --- |
| 1-K (Std) | 70/30 C/NS | Rubber Modified Phenolic |
| 2-L (Std) | 35/35/30 A/C/NS | Rubber Modified Phenolic |
| 3-L | 20/80 SG/C | Rubber Modified Phenolic |
| 4-K | 35/35/30 A/C/NS | Phenolic Resin |
| 5-L | 20/80 SG/C | Phenolic Resin |
| 6-L | 40/60 SG/C | Phenolic Resin |
| 7-L | 20/20/60 SG/BA/C | |

(1) Number indicates volume %
C = Silicon carbide abrasive (same size as SG)
A = Fused Alumina abrasive
SG = Norton sintered Sol Gel alumina abrasive (seeded)
NS = Nepheline Syenite (coarse - 36 grit)
BA = Bubble Alumina (size = 0.5 to 1.0 mm)

The wheel grade is a measure of the hardness of a wheel as measured by its SBP value and its apparent density (wt/unit volume). Typically this is conveyed by a letter theoretically running from A to ZZ though in practice only grades F through T are commonly encountered.

Wheels with a grade up to "O" are regarded as soft and those with a grade of "P" or higher are considered "hard". Thus wheel grades K and L are regarded as "soft" according to the definition given above.

| Item/Grade | % Volume of Wheel | | | | E-Modulus $\times 10^6$ dn/cm$^2$ |
| --- | --- | --- | --- | --- | --- |
| | Filler Type | Abr | Resin | Filler | Pores | |
| 1-K (Std) | None | 52.0 | 17.7 | 0 | 30.3 | 16 |
| 2-L (Std) | " | " | 19.0 | 0 | 29.0 | 16 |
| 3-L | " | " | 19.0 | 0 | 29.0 | 16 |
| 4-K | 75/25 FeS$_2$ K$_2$SO$_4$ | " | 14.2 | 3.5 | 30.3 | 24 |
| 5-L | 75/25 FeS$_2$ K$_2$SO$_4$ | " | 15.2 | 3.8 | 29.0 | 26 |
| 6-L | 75/25 FeS$_2$ K$_2$SO$_4$ | " | 15.2 | 3.8 | 29.0 | 26 |
| 7-L | 75/25 FeS$_2$ K$_2$SO$_4$ | " | 15.2 | 3.8 | 29.0 | 21.3 |

The wheels had a size of $36'' \times 3'' \times 12''$. The grit size was a blend of 50% 36 grit and 50% 46 grit.

The tests were carried out on rolls mounted on a Farrell roll grinder having a 40 horsepower drive. The wheel speed was 7000-8000 SFPM, using a coolant of water-soluble oil. The material in the rolls being ground consisted of a mixture of chilled iron and high chrome chilled iron.

The results of the tests were as follows:

| Item Grade | Abrasive/Abr Diluent | (inches) Material Removed from Rolls | (in3/min) Cut Rate | HP Power | In.$^3$/min. HP | Roll Shape Control | Grinding Action | E-Modulus $\times 10^6$ dn/cm$^2$ |
|---|---|---|---|---|---|---|---|---|
| 1-K | 70/30 C/NS | 1.512 | 2.23 | 42 | .054 | Poor | Good | 16 |
| 2-L | 35/35/30 A/C/NS | 2.349 | 2.70 | 40 | .068 | Fair | Good | 16 |
| 3-L | 20/80 SG/C | 3.171 | 3.00 | 44 | .068 | Fair | Good | 16 |
| 4-K | 35/35/30 A/C/NS | 1.525* | N/A | N/A | N/A | Poor | Hard Chatter | 24 |
| 5-L | 20/80 SG/C | 4.338 | 4.05 | 40 | .101 | Excellent | Good | 26 |
| 6-L | 40/60 SG/C | 5.125 | 9.15 | 64 | .142 | Excellent | Good | 26 |
| 7-L | 20/20/60 SG/BA/C | 5.200 | 5.29 | 37.8 | .140 | Excellent | Good | 21.3 |

*low value - material removed due to heavy chatter

The grinding results indicate that, when a high elastic modulus bond is combined with a conventional abrasive, the grinding wheel performs unacceptably with heavy chatter and vibration, as expected (Items 4-K vs 2-L). On the other hand, when the same high modulus bond is combined with blends of sintered sol gel alumina and silicon carbide abrasive particles (Items 5-L, 6-L), grinding performance is improved dramatically with no chatter and with improved roll shape control. Not only is chatter eliminated and shape control improved, but significantly increased wheel life and cutrates are also achieved. In the preferred embodiment, the sintered sol gel alumina is seeded sintered sol gel alumina. The sol gel alumina may be in the form of filaments, as described in the patent application of Rue et al, Ser. No. 07/345,139, filed Apr. 28, 1989 and in the patent application of Kalinowski et al, Ser. No. 07/345,153 filed Apr. 28, 1989, and the patent application of Kelly, Ser. No. 07/344,700, filed Apr. 28, 1989, all assigned to the same entity as the present application, and all three are herein incorporated by reference.

The filaments described in the above patent applications are known as "abrasive filament(s)" and the term is used to refer to ceramic abrasive bodies each having a generally consistent cross section along its length and having a length that is equal to or greater than the maximum dimension of the cross section, i.e., having an aspect ratio of at least one. These abrasive filaments which have a length greater than the cross section may be bent or twisted, so that the length is measured along the body rather than necessarily in a straight line. The abrasive filaments are preferably obtained, in general, by extruding or spinning a preferably seeded gel of hydrated alumina into continuous filaments, drying the filaments so obtained, cutting or breaking the filaments to the desired lengths, and then firing the filaments to a temperature of not more than 1500° C.

In general, the abrasive filaments are sintered sol gel alpha alumina-based polycrystalline abrasive filaments. The alpha alumina crystallites in the abrasive filaments may be as large as 2 to 10 microns if the gel is not seeded, but with the preferred seeded gels are less than 1 micron and with optimal processing less than about 0.4 micron. The filaments can be made by preparing a sol gel of a hydrated alumina, spinning or extruding the gel into filaments, drying the filaments, and firing the dried filaments to a temperature of not more than 1500° C. In its preferred mode, the process includes the addition to the initial sol or gel, an effective amount of a submicron crystalline seed material that promotes the rapid conversion of the hydrated alumina in the gel to very fine alpha alumina crystals when the extruded and dried sol gel is fired. Examples of such seed material are beta alumina, gamma alumina, chromium oxide, alpha ferric oxide, alpha alumina, and precursors of these oxides, as well as other fine debris that will act as nucleation sites for alpha alumina.

It is also often preferred that the abrasive particles or alternatively the bond material itself are treated with a silane to improve the wet strength of the wheel obtained.

A portion of the silicon carbide could be replaced by fused alumina particles or bubble alumina. The preferred filler grinding aid is selected from $FeS_2$, $K_2SO_4$, $K_3AlF_6$, $KAlF_4$, or $Na_3AlF_6$.

Obviously, minor changes may be made in the form and construction of this invention without departing from its spirit. Thus, it is not desired to confine the invention to the exact form shown and described, but it is desired to include all such as properly come within the scope claimed.

The invention having been thus described, what is claimed as new and desired to secure by Letters Patent is:

1. Abrasive wheel, having a sand blast penetration of up to about 5.10 mm and a weight per unit volume of up to 2.80, comprising:
    (a) seeded sol gel alumina abrasive particles,
    (b) silicon carbide abrasive particles, and
    (c) a high elastic modulus resin bond in which the particles are carried.

2. Abrasive wheel as recited in claim 1, wherein a portion of the silicon carbide particles is replaced by fused alumina particles and/or bubble alumina, and wherein an active filler grinding aid is carried in the resin bond.

3. Abrasive wheel as recited in claim 2, wherein the filler grinding aid is selected from the group consisting of $FeS_2$, $K_2SO_4$, $Na_3AlF_6$, and $K_3AlF_6$, $KAlF_4$, and mixtures thereof.

4. Abrasive wheel as recited in claim 3, wherein the filler grinding aid is a mixture of $FeS_2$ and $K_2SO_4$.

5. Abrasive wheel as recited in claim 1, wherein the resin bond is selected from the group consisting of phenolic and epoxy resins.

6. Abrasive wheel having a sand blast penetration of up to about 5.00 mm and a weight per unit volume of up to 2.80 g/cc, comprising:
    (a) Seeded sol gel alumina abrasive particles,
    (b) silicon carbide abrasive particles, and
    (c) a high elastic modulus resin bond in which the particles are carried.

7. Abrasive wheel as recited in claim 6, wherein a portion of the silicon carbide particles is replaced by fused alumina particles and/or bubble alumina, and wherein an active filler grinding aid is carried in the resin bond.

8. Abrasive wheel as recited in claim 7, wherein the filler grinding aid is selected from the group consisting of $FeS_2$ and $K_2SO_4$, $Na_3AlF_6$, and $K_3AlF_6$, $KAlF_4$, and mixtures thereof.

9. Abrasive wheel as recited in claim 8, wherein the filler grinding aid is a mixture of $FeS_2$ and $K_2SO_4$.

10. Abrasive wheel as recited in claim 6, wherein the resin bond is selected from the group consisting of phenolic and epoxy resins.

11. Abrasive wheel as recited in claim 1, wherein a portion of the silicon carbide is replaced by abrasive particles selected from the group consisting of co-fused alumina-zirconia, sintered alumina., sintered bauxite, garnet, flint, and sintered alumina-zirconia.

12. Abrasive wheel having a sand blast penetration of up to about 5.00 mm and a weight per unit volume of up to 2.80 g/cc, comprising:
   (a) seeded sol gel alumina abrasive particles of filamentary shape,
   (b) silicon carbide particles; and
   (c) a high elastic modulus bond in which the particles are carried.

13. Abrasive wheel as recited in claim 12, wherein a portion of the silicon carbide particles is replaced by abrasive particles selected from the group consisting of fused alumina particles, and bubble alumina, and wherein an active filler grinding aid is carried in the bond.

14. Abrasive wheel as recited in claim 13, wherein the filler grinding aid is a mixture of $FeS_2$ and $K_2SO_4$.

15. Abrasive wheel as recited in claim 13, wherein the filler grinding aid is selected from the group consisting of $FeS_2$, $K_2SO_4$, $Na_3AlF_6$, and $K_3AlF_6$, $KAlF_4$, and mixtures thereof.

16. Abrasive wheel as recited in claim 12, wherein the bond is a resin selected from the group consisting of phenolic and epoxy resins.

17. Abrasive wheel as recited in claim 12, wherein the particles of filamentary shape have an average aspect ratio of at least 1.0, have a hardness of at least 16 GPa, and are formed of alpha alumina crystals having a size no greater than 1 micron.

* * * * *